United States Patent
Foster

(10) Patent No.: US 7,374,034 B2
(45) Date of Patent: May 20, 2008

(54) RECIPROCATING SLAT CONVEYOR WITH BEARING PLANKS ON FIXED SLATS BETWEEN MOVING SLATS

(75) Inventor: Raymond Keith Foster, Madras, OR (US)

(73) Assignee: Keith Investments, LLC, Madras, OR (US)

( * ) Notice: Subject to any disclaimer, the term of this patent is extended or adjusted under 35 U.S.C. 154(b) by 0 days.

(21) Appl. No.: 11/330,614

(22) Filed: Jan. 12, 2006

(65) Prior Publication Data

US 2008/0023300 A1    Jan. 31, 2008

(51) Int. Cl.
*B65G 25/04* (2006.01)

(52) U.S. Cl. .............................. 198/750.3; 198/750.4; 414/525.1; 414/525.6

(58) Field of Classification Search ............ 198/750.2, 198/750.3, 750.4; 414/525.6
See application file for complete search history.

(56) References Cited

U.S. PATENT DOCUMENTS

| | | | | |
|---|---|---|---|---|
| 4,856,645 A | * | 8/1989 | Hallstrom, Jr. ......... | 198/750.4 |
| 5,044,870 A | * | 9/1991 | Foster ..................... | 414/809 |
| 5,419,426 A | * | 5/1995 | Foster ..................... | 198/750.4 |
| 5,547,067 A | * | 8/1996 | Foster ..................... | 198/750.3 |
| 6,019,215 A | * | 2/2000 | Foster ..................... | 198/750.3 |
| 6,782,994 B1 | * | 8/2004 | Foster ..................... | 198/750.2 |

* cited by examiner

*Primary Examiner*—Mark A Deuble
(74) *Attorney, Agent, or Firm*—Delbert J. Barnard

(57) ABSTRACT

Fixed conveyor slats (12) in the nature of beams extend over a window in a support framework (70, 72, 74, 76, 86, 88) for the movable and fixed slats (10, 12) of the reciprocating slat conveyor. The fixed slats (12) support the movable slats (10), including in the region of the window. The fixed and movable slats (12, 10) are box beams, providing them with strength and stiffness in the region of the window. The fixed slats (12) are covered by planks of bearing material (46). Side portions (14, 16) of the movable slats (10) set down on side portions (50, 48) of the planks of bearing material (46). The planks of bearing material (46) are connected at one end only to the fixed slats (12). The bearing material (46) is capable of withstanding the heat of hot asphalt concrete and protects the fixed slats (12) from contact with the asphalt concrete.

15 Claims, 7 Drawing Sheets

RECIPROCATING SLAT CONVEYOR WITH BEARING PLANKS ON FIXED SLATS BETWEEN MOVING SLATS

TECHNICAL FIELD

This invention relates to reciprocating slat conveyors. More particularly, it relates to reciprocating slat conveyors comprising laterally spaced apart movable conveyor slats and laterally spaced apart fixed conveyor slats located between the movable conveyor slats, and to a bearing system for mounting the movable conveyor slats for longitudinal movement. It also relates to the provision of a reciprocating slat conveyor that is especially adapted for handling hot asphalt concrete, or the like.

BACKGROUND OF THE INVENTION

My U.S. Pat. No. Re35,022, granted Aug. 22, 1995, and entitled Reduced Size Drive-Frame Assembly For A Reciprocating Slat Conveyor, discloses a reciprocating slat conveyor in which the conveyor slats are connected to transverse drive beams which are in turn connected to linear hydraulic motors. The linear hydraulic motors move the drive beams and the drive beams move the conveyor slats that are connected to them.

My U.S. Pat. No. 5,350,057, granted Sep. 27, 1994, and entitled Ball Block For Mounting Linear Motor, discloses a reciprocating slat conveyor in which the transverse drive beams are physically separated from the linear hydraulic motors. The linear hydraulic motors are connected to selected conveyor slats that are directly driven by the linear hydraulic motors. The driven conveyor slats are connected to additional conveyor slats by the transverse drive beams.

My U.S. Pat. No. 6,409,009, granted Jun. 25, 2002, and entitled Conveyor Slat Connector And Connection Method, and my U.S. Pat. No. 6,575,293, granted Jun. 10, 2003, each discloses apparatus for connecting conveyor slats to transverse drive beams.

My U.S. Pat. No. 5,044,870, granted Sep. 3, 1991, and entitled Method For Collecting And Compacting Garbage And Then Loading It Into A Road Vehicle, discloses a reciprocating slat conveyor composed of laterally spaced apart moving conveyor slats and laterally spaced apart fixed conveyor slats that are located between the movable conveyor slats.

The present invention provides an improvement on the conveyor that is disclosed by U.S. Pat. No. 5,044,807. The improvement includes use of some technology disclosed in my above-identified patents Nos. 5,350,054; 6,409,009; 6,575,293 and Re35,022, in addition to new technology. The contents of U.S. Pat. No. 5,044,870 are incorporated herein by this specific reference.

BRIEF SUMMARY OF THE INVENTION

A reciprocating slat conveyor constructed according to the present invention comprises a plurality of laterally spaced apart, upwardly convex, movable conveyor slats. A plurality of laterally spaced apart, upwardly concave, fixed slats are located between the movable slats. An elongated, upwardly concave, plank of bearing material is situated on each fixed slat. Each plank of bearing material extends lengthwise and crosswise of its fixed slat and has side portions. The movable slats each include a top having side portions that overhang the side portions of the planks of bearing material that are on the fixed slats below them. The side portions of the tops of the movable slats sit down on and are slideably supported on and by the side portions of the planks of bearing material. The planks of bearing material cover the regions of the fixed slats that are between the conveyor slats.

Preferably, each fixed slat has a base structure and a top. The top includes side portions which extend laterally outwardly from the base structure. The movable conveyor slats include retainer side parts that project laterally outwardly into positions below the laterally outwardly projecting side portions of the tops of the base structure of the fixed slats. The retainer parts of the movable conveyor slats include bearing material that confronts the side portions of the top of the base structure.

Also in preferred form, the movable conveyor slats each includes a central tubular beam section extending longitudinally of the slats below the top of the conveyor slats, between the overhanging side portions.

In preferred form, each plank of bearing material is connected at one end to its fixed slat and is free of connection throughout the remaining part of its length.

Also in preferred form, the planks of bearing material are made of a material that can withstand the heat of hot asphalt concrete. This enables the conveyor to be used for conveying hot asphalt concrete.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and.

DETAILED DESCRIPTION OF THE ILLUSTRATED EMBODIMENT

Figure 1:
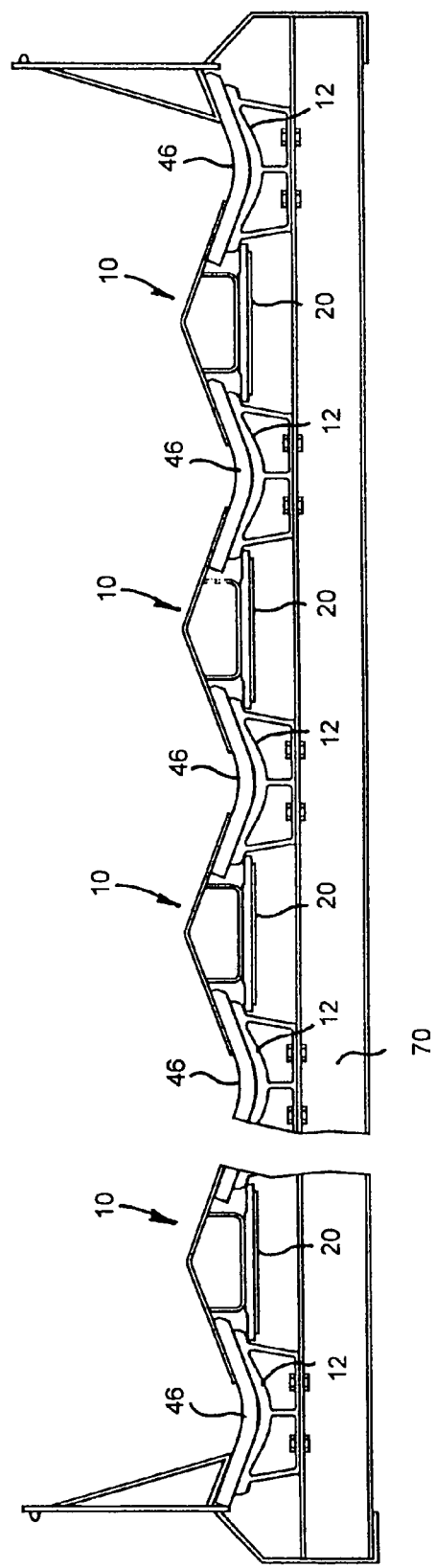
FIG. 1 is rear end elevational view of a slat conveyor that forms the bottom of a material compartment, such view being broken away for the purpose of indicating indeterminate width of the conveyor structure.

My aforementioned U.S. Pat. No. 5,044,870 discloses a reciprocating slat conveyor within a container that receives bulk material. The conveyor extends substantially the full length of the container. An embodiment of the conveyor is disclosed herein. It includes movable conveyor slats 10 that are laterally spaced apart and fixed conveyor slats 12 that are laterally spaced apart and are positioned between the movable slats 10. The movable slats 10 have a shallow V-shape in cross section and are composed of side portions 14, 16 that slope outwardly and downwardly from an apex 18. Together the side portions 14,16 form a top wall 14,16 for a longitudinally extending box beam 20. The movable slats 10 include a lower central portion composed of laterally spaced apart sidewalls 22, 24 and a bottom wall 26. As clearly shown by FIG. 5, the walls 22, 24, 26 form a channel structure. The sidewalls 22, 24 are the flanges of the channel and the bottom wall 26 is the web of the channel. The top wall 14,16 is connected to the upper edges of the flanges 22, 24 to complete a box beam structure that extends longitudinally of the conveyor slat 10. Top wall 14,16 includes side portions 26, 28 that extend laterally outwardly from the central box beam portion 20.

The fixed slats 12 also have a central box beam portion 30 formed by a top wall 32, sidewalls 34, 36, a central wall 38 and a bottom wall 40. The sidewalls 34, 36 slope outwardly by a few degrees x (e.g. about ten degrees) from vertical as they extend upwardly from bottom wall 40. Central wall 38 extends substantially vertically. The top wall 32 of the fixed slats 12 is upwardly concave, giving the fixed slats 12 a shallow V-shape at their tops.

The top wall 32 includes laterally outwardly projecting, opposite side portions 42, 44 that project laterally outwardly from the sidewalls 34, 36 of the box beam section 30.

Figure 2:
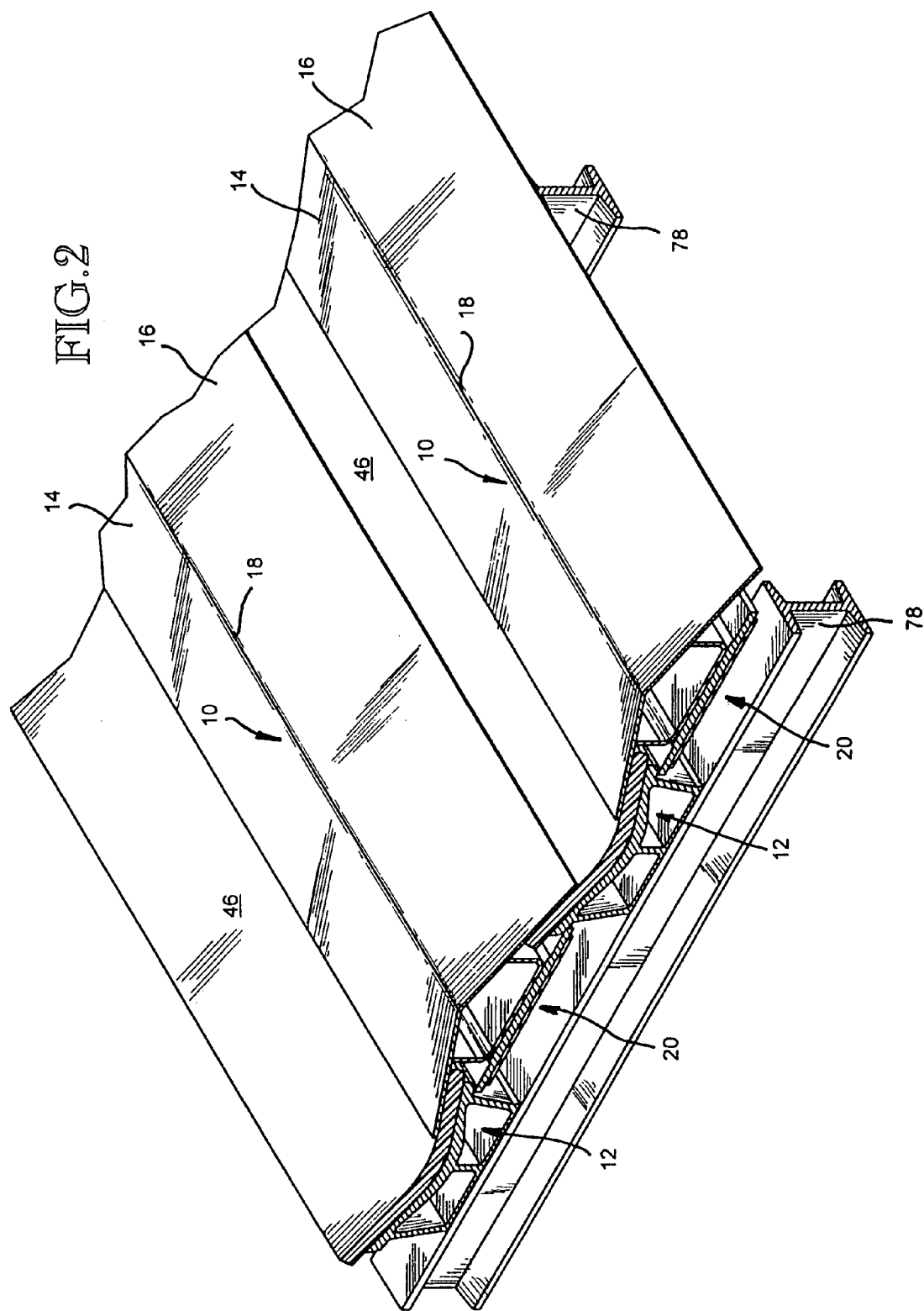
FIG. 2 is a fragmentary pictorial view taken from above and showing a portion of the fixed and movable slats in cross section.
Figure 3:
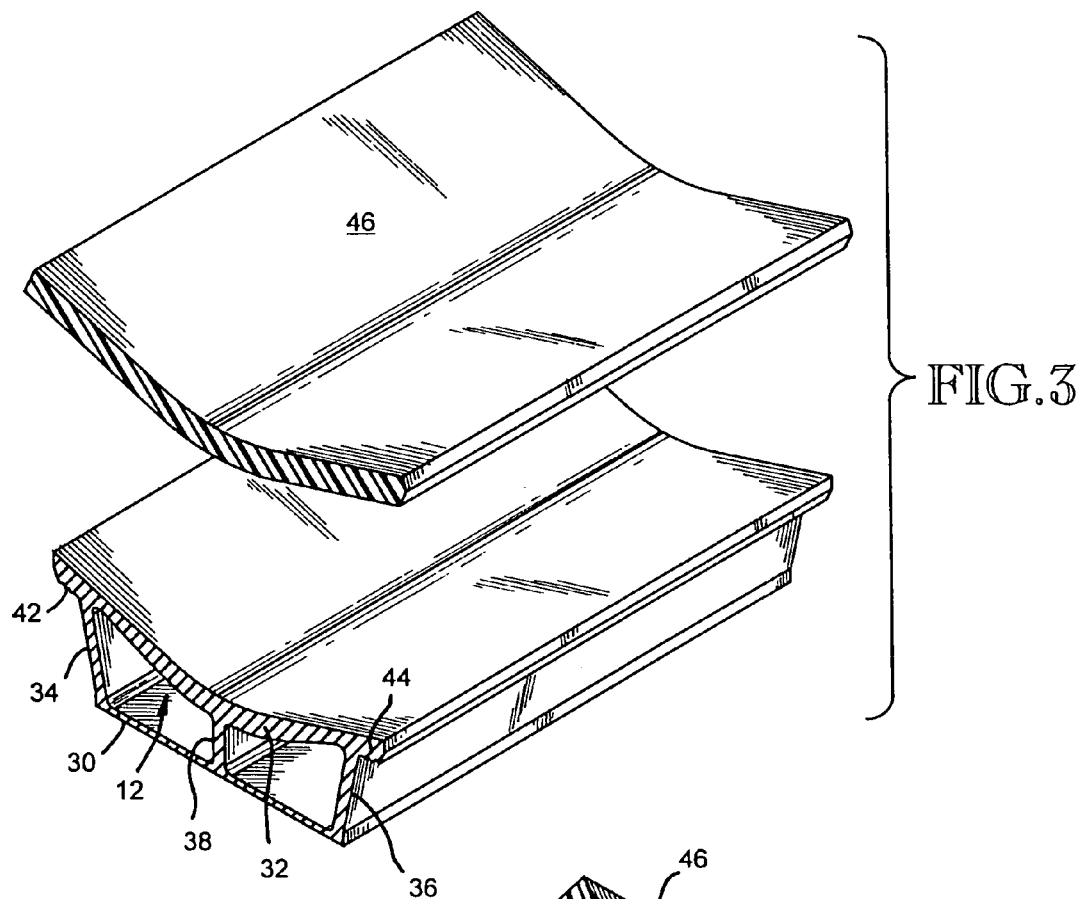
FIG. 3 is an exploded pictorial view of a portion of a fixed slat and a plank of bearing material that is supported by the fixed slat.
Figure 4:
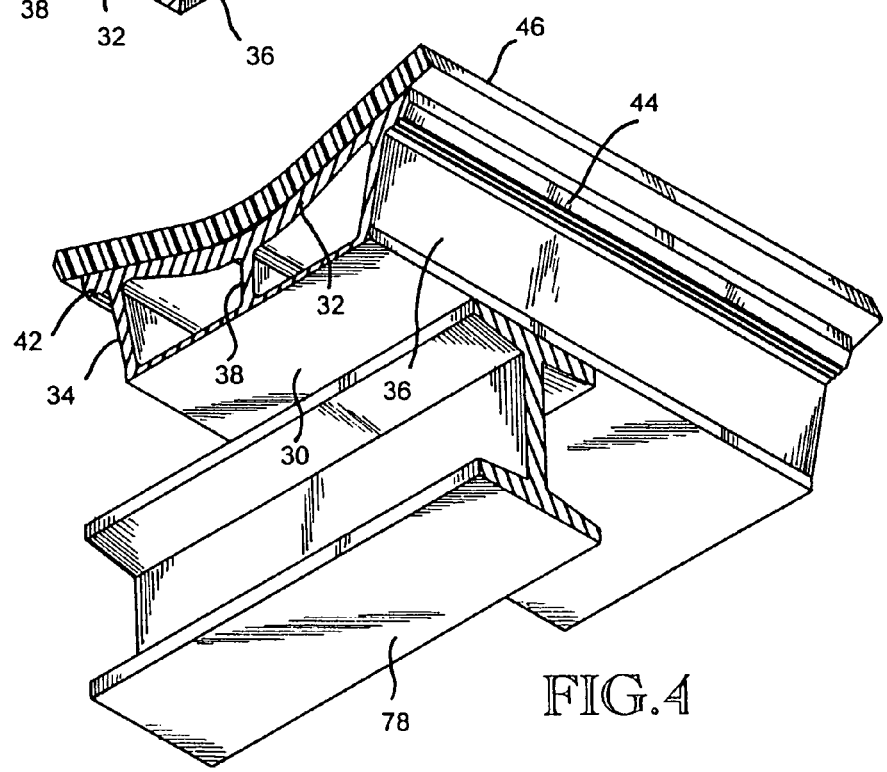
FIG. 4 is a fragmentary pictorial view taken from below, and looking upwardly towards the components shown in FIG. 3 in an assembled condition, and a portion of a supporting frame member.
Figure 5:
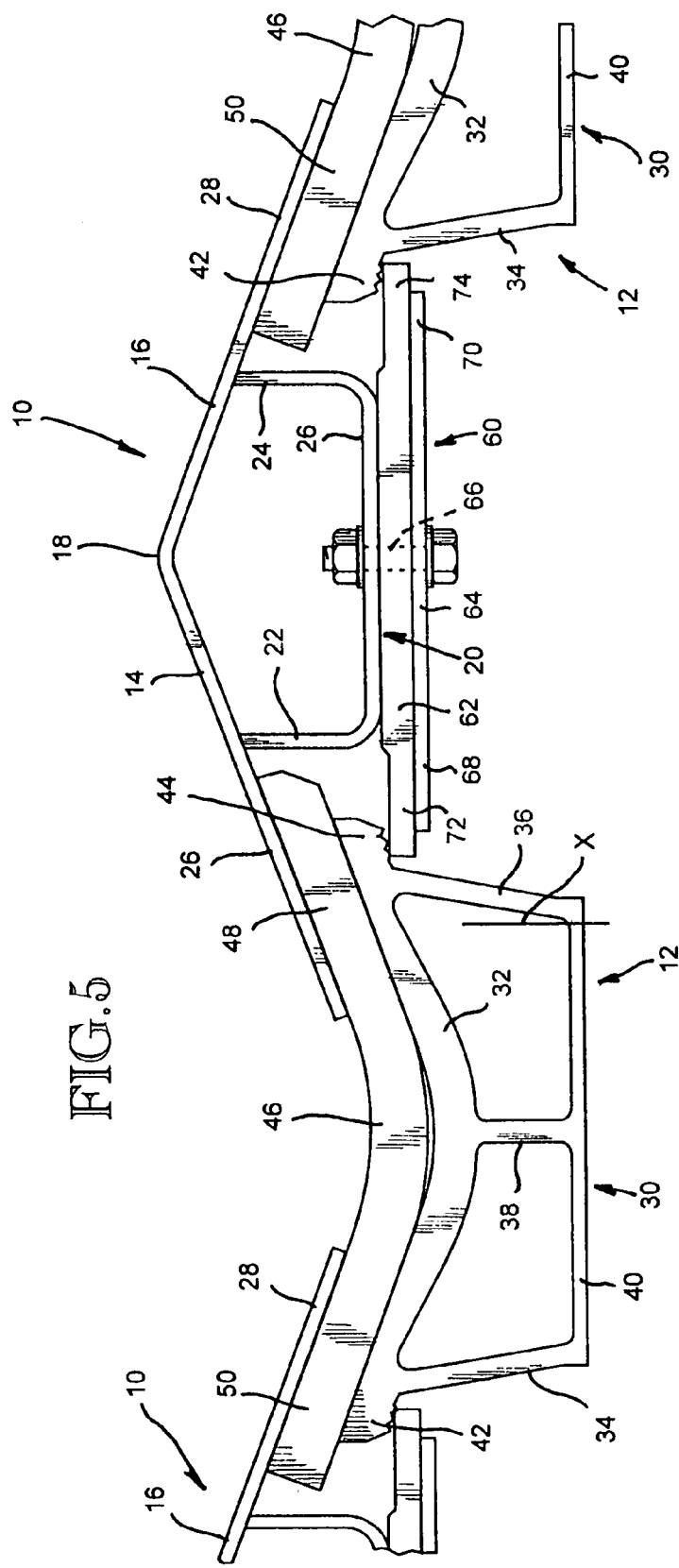
FIG. 5 is an enlarged scale view of a fragmentary portion of FIG. 1.

According to the invention, a plank of bearing material 46 sits down on the top wall 32 of each fixed slat 12. Each plank of bearing material 14 has a shallow V-shaped cross section substantially conforming to the cross sectional shape of the top wall 32. As best shown by FIG. 5, the planks 46 are relatively thick and they may be somewhat wider than the top walls 32 of the fixed slats 12. Each plank 46 extends both laterally and longitudinally of its fixed slat 12. As best shown by FIGS. 1, 2 and 5, the side portions 26, 28 of the tops 14, 16 of the movable conveyor slats 10 extend over, cover and rest on side portions 48, 50 of the bearing blanks 46. The central portions of the bearing planks 14 cover the regions of the fixed slats 12 between the movable conveyor slats 10.

Figure 6:
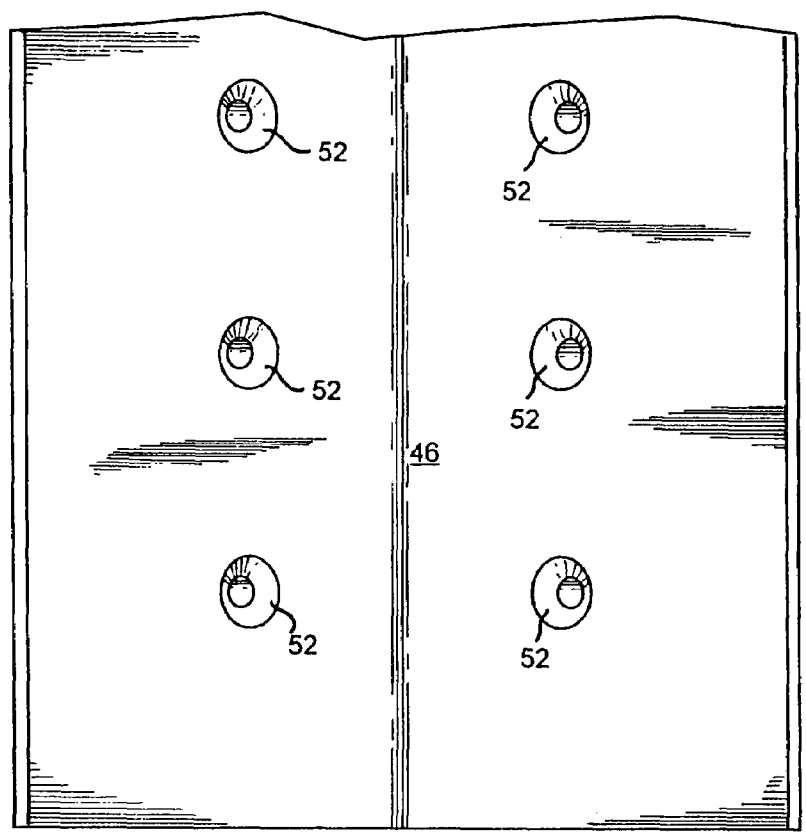
FIG. 6 is a top plan view of a fragmentary end portion of a plank of bearing material.
Figure 7:
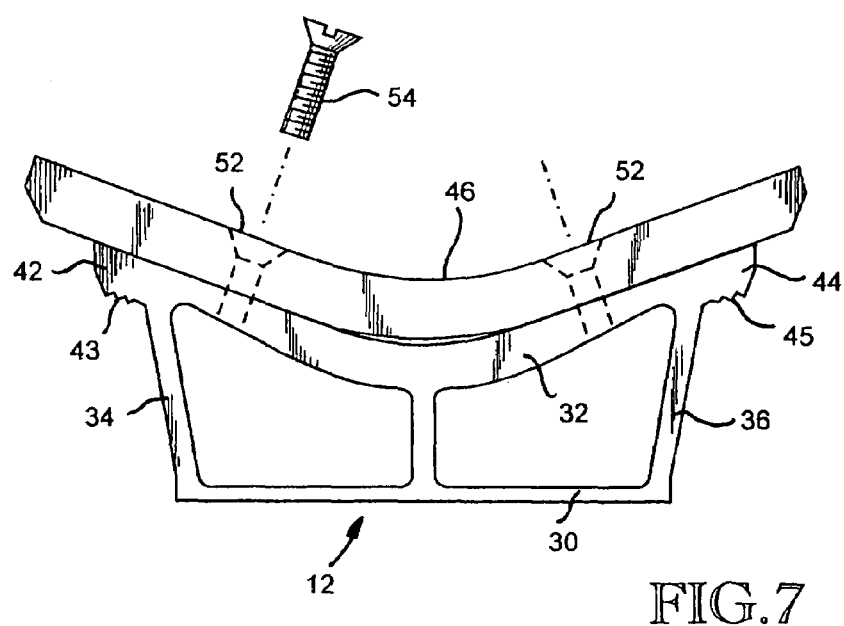
FIG. 7 is an end view of a fixed slat and a plank of bearing material on the fixed slat.

As shown by FIGS. 6 and 7, fastener openings 52 are formed in one end portion only of the bearing planks 46 and the top walls 32 of the fixed slats 12. By way of example, FIGS. 6 and 7 show the use of six-screw fasteners 54. Except for the region of these fasteners 52, the rest of the bearing plank 46 is unattached to the fixed slats 12. The V-shaped matching of the bearing planks 46 to the tops 32 of the fixed slats 12 and the use of fasteners 54 at one end only of the bearing plank/fixed slat assemblies 46, 12 are sufficient to secure the bearing planks 46 to the fixed slats 12 so that the bearing planks 46 will stay in place. An advantage of the above-described use of the bearing planks 46 and their arrangement on the fixed slats 12, between the movable conveyor slats 10, is that a heat resistant-bearing material can be used for the bearing planks 46 and the conveyor can be used for conveying a hot material like asphalt concrete. As well known, asphalt concrete is a building material composed of rock aggregate held together by an asphalt binder. When asphalt concrete is being applied to form a surface, the asphalt binder is hot, making the mixture of binder and aggregate sufficiently fluid that it can be dumped and spread where a hard surface is to be formed by the asphalt concrete when it has hardened. As is well known, different materials expand and retract at different rates when exposed to hot and cold. The use of full bearing planks 46 covering the fixed slats 12 permits use of the conveyor for conveying such materials as hot asphalt concrete. The asphalt concrete does not stick to the bearing plank material. The asphalt concrete is moved by the conveyor slats 10 during operation of the conveyor. The presence of the bearing plank covering for the fixed slats 12 prevents the asphalt from sticking to the fixed slats.

The conveyor slats 10 are held down onto the fixed slats 12 while at the same time are allowed to move by the use of retainers 60 that are secured to the box beams 20 and are preferably made up from bearing members 62 and metal members 64. The assemblies 60 of bearing members 62 and metal members 64 are relatively short in length (FIGS. 8 and 9) and are longitudinally spaced apart along the slats 10. Nut and bolt assemblies 66 are used to secure the members 62, 64 to the bottom walls 26 of the box beams 20. The metal members 64 are in the nature of leaf springs in their outer regions 68, 70. They bias the side regions 72, 74 of the bearing material 62 upwardly against the lower surfaces of the side portions 42, 44 of the top walls 32 of the fixed slats 12. As best shown by FIGS. 5 and 6, the lower regions of the overhanging portions 42, 44 may have a saw tooth configuration at 43, 45 so that they present downwardly directed edges that make a sliding contact with the bearing material 62 in the regions 72, 74. This facilitates sliding movement of the movable conveyor slats 10 relative to the fixed slats 12. The spring action of the metal members 64 biases the bearing material 62 upwardly against the downwardly directed saw tooth edges of the fixed slat material in the overhanging regions 42, 44. The small area of contact between the saw tooth edges and the bearing material 62 in the regions 72, 74 promotes easy sliding movement where contact occurs between the saw teeth regions 42, 44 and the bearing regions 72, 74.

The conveyor frame below the slats 10, 12 comprises longitudinal beams 70, 72, 74, 76 (FIGS. 8 and 9) and transverse beams 78. Longitudinal beams 74, 76 may be like the main frame beams disclosed in my U.S. Pat. No. Re 35,022.

Figure 8:
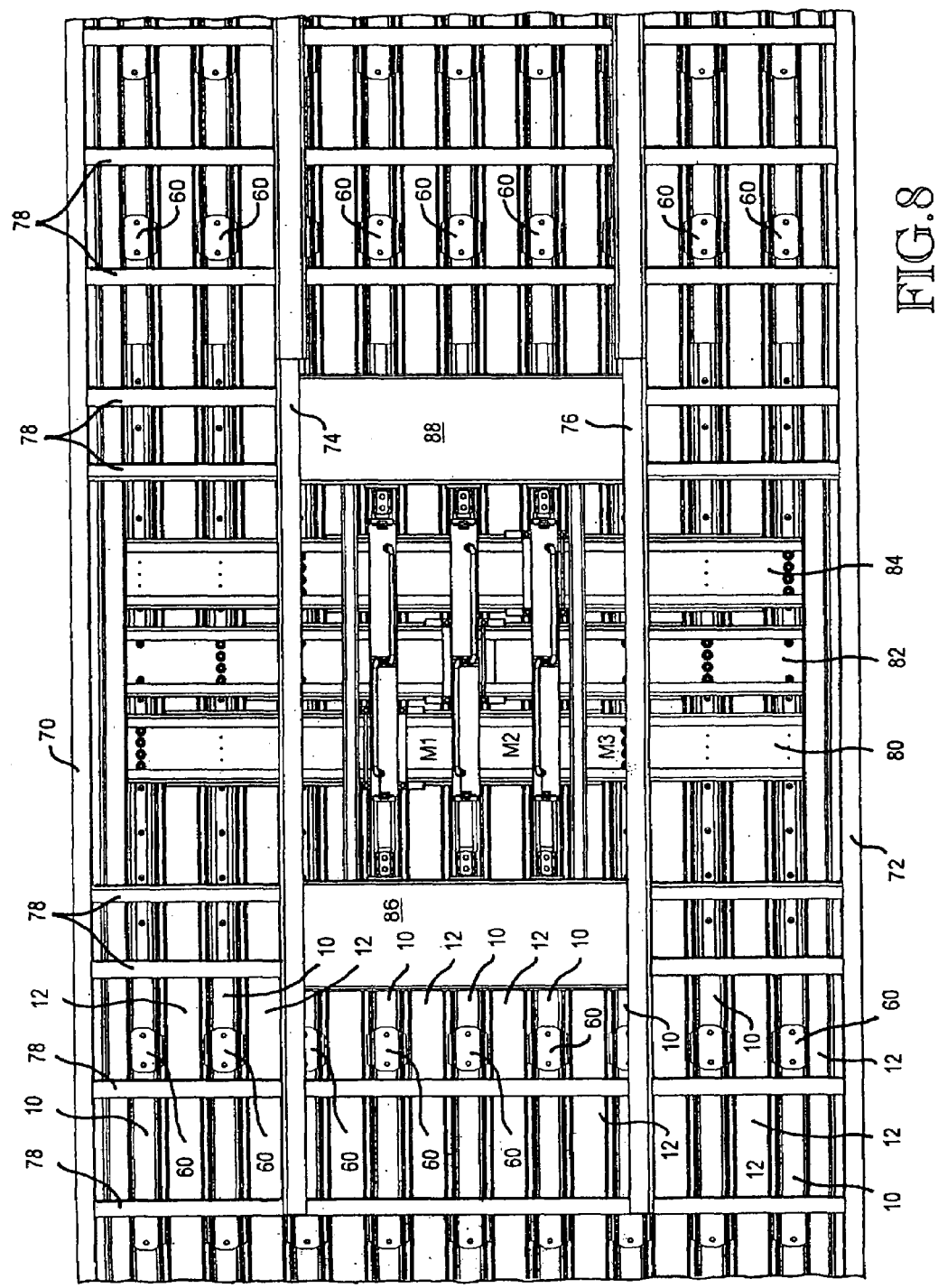
FIG. 8 is a bottom plan view of a fragmentary portion of a conveyor that includes the invention, looking towards a drive assembly for removable slats.

As is well known in the art, a separate linear hydraulic motor is connected to each transverse drive beam. FIG. 8, for example, shows a Running Floor II® drive assembly connected to the movable slats 10. This assembly is disclosed in detail in my U.S. Pat. No. 4,748,893, the contents of which are incorporated herein by this specific reference to that patent. In a conveyor that includes three transverse drive beams 80, 82, 84, there are three linear hydraulic motors M1, M2, M3. The movable components of the linear hydraulic motors M1, M2, M3 are connected to the transverse drive beams 80, 82, 84. The stationary components are connected to a portion of the frame structure 86, 88 (FIG. 8). Alternatively, the movable components of the linear hydraulic motors may be connected to portions of three different movable conveyor slats, one from each of the three sets of movable conveyor slats. Then, the conveyor slats for each set can be connected together by a transverse drive beam that is spaced axially from the linear hydraulic motor. In such embodiment, the transverse drive beam served to connect the driven slat (the slat that is connected to the linear hydraulic drive motor) to the remaining slats of the set.

Figure 9:
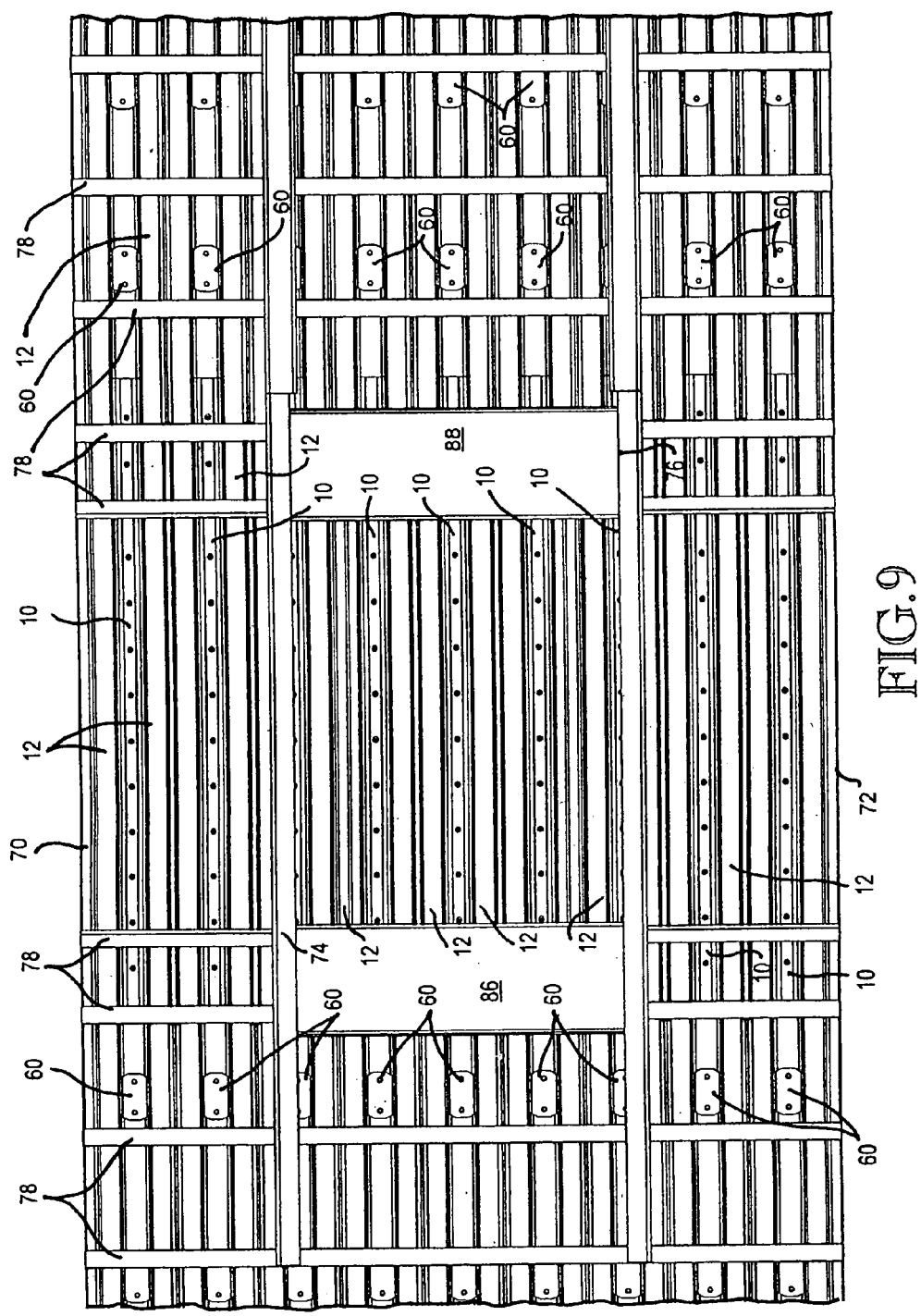
FIG. 9 is a view like FIG. 8, but with the transverse drive beams and the hydraulic drive units omitted, for better showing the lower portions of the fixed and movable slats in the region in the drive assembly.

As shown by FIGS. 8 and 9, the conveyor framework includes a window between the members 86, 88 that is sized to receive the three transverse drive beams 80, 82, 84 and allow them to reciprocate in the window longitudinally of the conveyor. The fixed slats and the movable slats both extend longitudinally over this window. In the region of the window, the box beam slats 10, 12 transmit the weight of the conveyor slats and the load on them that is imposed downwardly on the drive beams 80, 82, 84 to the framework 86, 88 that is end wise of the window.

The cycle of operation of the moving slats 10 is the same as what is disclosed in my U.S. Pat. No. Re 35,022. That is, the three linear hydraulic motors M1, M2, M3 are used to move all of the conveying slats 10 in the conveying direction. This moves the load that is on the slats 10 a distance equal to the stroke length of the hydraulic motors M1, M2, M3. Then, the motors are reversed in sequence to retract one-third of the slats 10 at a time. As one-third of the slats are retracting, the other two-thirds remain stationery. As a result, they hold the load against moving backwards with the retracting slats. When all three sets of the slats have been retracted, all of the conveyor slats 10 are again moved forward in the conveying direction for conveying the load an additional amount. The material in the moving slats 10 is interlocked with the material on the bearing planks 46. As a result, the material on the bearing planks 46 is moved along with the material that is on the moving slats 10. The bearing plank material is a structural plastic with an exceptionally low surface abrasion which keeps this characteristic even when heated to the temperature of hot asphalt concrete. It may be a high molecular weight resinous material that is known in the trade as UHMW materials. These resinous materials are available from several manufacturers and are easy to obtain.

The illustrated embodiments are only examples of the present inventions and, therefore, are non-limitive. It is to be understood that many changes in the particular structure, material and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use of the doctrine of equivalents and reversal of parts.

What is claimed is:

1. A reciprocating slat conveyor, comprising:
   a plurality of laterally spaced apart, upwardly convex, movable conveyor slats;
   a plurality of laterally spaced apart, upwardly concave, fixed slats between the movable slats;
   an elongated, upwardly concave, plank of bearing material on each fixed slat, each plank of bearing material extending lengthwise and crosswise of its fixed slat and having opposite side portions;
   said movable slats each having a top with side portions that overhang the side portions of the planks of bearing material that are on the fixed slats, below said side portions of the tops of the movable slats, said side portions of the tops of the movable slats sitting down on and being slideably support on and by the side portions of the planks of bearing material;
   wherein the planks of bearing material cover the regions of the fixed slats that are between the movable slats;
   wherein each fixed slat has a base structure and a top, said top including side portions which extend laterally outwardly from the base structure; and
   said movable conveyor slats including lower side parts that project laterally outwardly into positions below the laterally outwardly projecting side portions of the tops of the base structure of the fixed slats, said side parts including bearing material confronting the side portions of the top of the base structure.

2. The conveyor of claim 1, wherein the movable conveyor slats each includes a central tubular beam section extending longitudinally of the slats below the top of the conveyor slats, between the overhanging side portions.

3. The conveyor of claim 2, wherein the planks of bearing material are made of a material that can withstand the heat of hot asphalt concrete, whereby the conveyor can be used for conveying hot asphalt concrete.

4. The conveyor of claim 1, wherein the movable conveyor slats each includes a central tubular beam section extending longitudinally of the slats below the top of the conveyor slat, between the overhanging side portions of the top of the conveyor slats.

5. The conveyor of claim 1, wherein each plank of bearing material is connected at one end to its fixed slat and is free of connection throughout the remaining part of its length.

6. The conveyor of claim 5, wherein the planks of bearing material are made of a material that can withstand the heat of hot asphalt concrete, whereby the conveyor can be used for conveying hot asphalt concrete.

7. The conveyor of claim 1, wherein the planks of bearing material are made of a material that can withstand the heat of hot asphalt concrete, whereby the conveyor can be used for conveying hot asphalt concrete.

8. The conveyor of claim 1, wherein each fixed slat has a top and a central beam section extending longitudinally of the fixed slat below the top, and each movable conveyor slat includes a top and a central beam section extending longitudinally of the movable conveyor slat below the top.

9. The conveyor of claim 8, wherein each beam section is tubular.

10. The conveyor of claim 9, wherein the top of each fixed slat has side portions that extend laterally outwardly from the beam section.

11. The conveyor of claim 8, wherein the top of each fixed slat has side portions that extend laterally outwardly from the beam section.

12. The conveyor of claim 8, wherein each movable conveyor slat has a longitudinal beam section below the central portion of the top of the movable conveyor slat.

13. A reciprocating slat conveyor, comprising:
   a plurality of laterally spaced apart, upwardly convex, movable conveyor slats;
   a plurality of laterally spaced apart, upwardly concave, fixed slats between the movable slats;
   an elongated, upwardly concave, plank of bearing material on each fixed slat, each plank of bearing material extending lengthwise and crosswise of its fixed slat and having opposite side portions;
   said movable slats each having a top with side portions that overhang the side portions of the planks of bearing material that are on the fixed slats, below said side portions of the tops of the movable slats, said side portions of the tops of the movable slats sitting down on and being slideably support on and by the side portions of the planks of bearing material;
   wherein the planks of bearing material cover the regions of the fixed slats that are between the movable slats;

wherein each fixed slat has a base structure and a top and said top includes side portions which extend laterally outwardly from the base structure, and said movable conveyor slats include a central section extending longitudinally of the conveyor slats, and a plurality of retainers spaced longitudinally apart along the conveyor slat, said retainers being connected to the central section of the conveyor slats and including laterally outwardly projecting portions that extend below and confront the side portions of the base structure.

14. The conveyor of claim 13, wherein said retainers have upwardly directed side portions which confront the side portions of the top of the base structure, said side portions projecting into positions below the side portions of the tops of the fixed slats, and including bearing material confronting the side portions of the top of the base structure.

15. The conveyor of 13, wherein each said retainer includes a metal plate below the bearing material said metal plate being connected to the central portion of the movable conveyor slat.

* * * * *